United States Patent [19]

Okada et al.

[11] Patent Number: 4,700,388
[45] Date of Patent: Oct. 13, 1987

[54] APPARATUS FOR SCRAMBLING A TELEVISION SIGNAL

[75] Inventors: Takashi Okada; Takao Mogi, both of Kanagawa, Japan

[73] Assignee: Sony Corporation, Tokyo, Japan

[21] Appl. No.: 899,798

[22] Filed: Aug. 25, 1986

Related U.S. Application Data

[63] Continuation of Ser. No. 518,810, Jul. 29, 1983.

[51] Int. Cl.⁴ .................... H04N 7/167; H04L 9/02
[52] U.S. Cl. .................................... 380/20; 380/10; 380/17; 380/21
[58] Field of Search ............. 358/114, 122, 123, 124

[56] References Cited

U.S. PATENT DOCUMENTS

| 4,075,660 | 2/1978 | Horowitz | 358/124 |
| 4,340,906 | 7/1982 | den Toonder et al. | 358/124 |
| 4,484,027 | 11/1984 | Lee et al. | 358/122 |
| 4,514,761 | 4/1985 | Merrell et al. | 358/123 |
| 4,533,949 | 8/1985 | Fujimura et al. | 358/122 |

FOREIGN PATENT DOCUMENTS 841627  7/1960  United Kingdom ............ 358/123

Primary Examiner—Stephen C. Buczinski
Assistant Examiner—Melissa L. Koltak
Attorney, Agent, or Firm—Lewis H. Eslinger; Alvin Sinderbrand

[57] ABSTRACT

An apparatus for scrambling or encoding a television signal by inverting the latter signal in accordance with a control signal having a predetermined code pattern comprises a detector circuit for detecting a change in a picture scene of the television signal and generating an identification signal in response to detection of the scene change and code generator for generating a key code signal of specific pattern which indicates a particular program of the television signal. According to this invention, the control signal is formed in response to both the identification signal and the key code signal.

16 Claims, 20 Drawing Figures

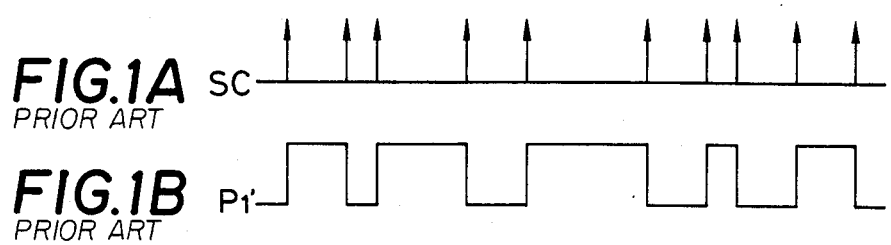
FIG.1A SC *PRIOR ART*
FIG.1B P1' *PRIOR ART*
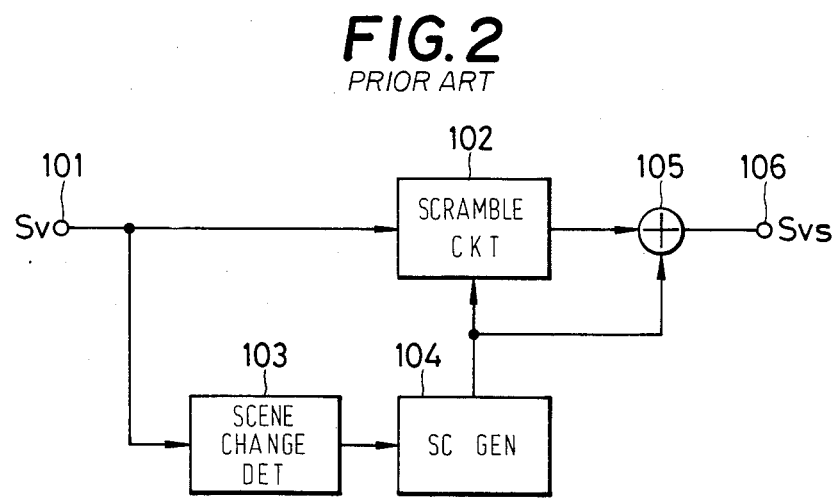
FIG.2 *PRIOR ART*

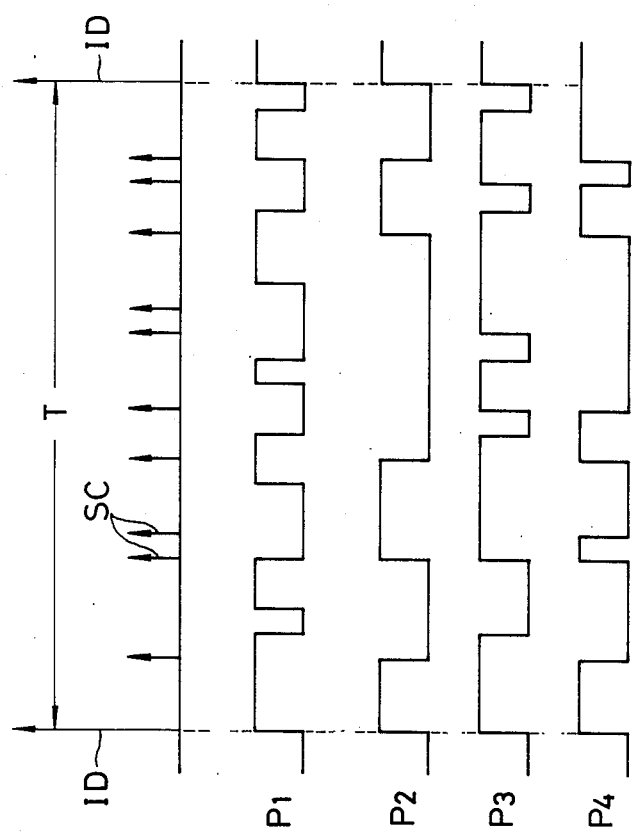

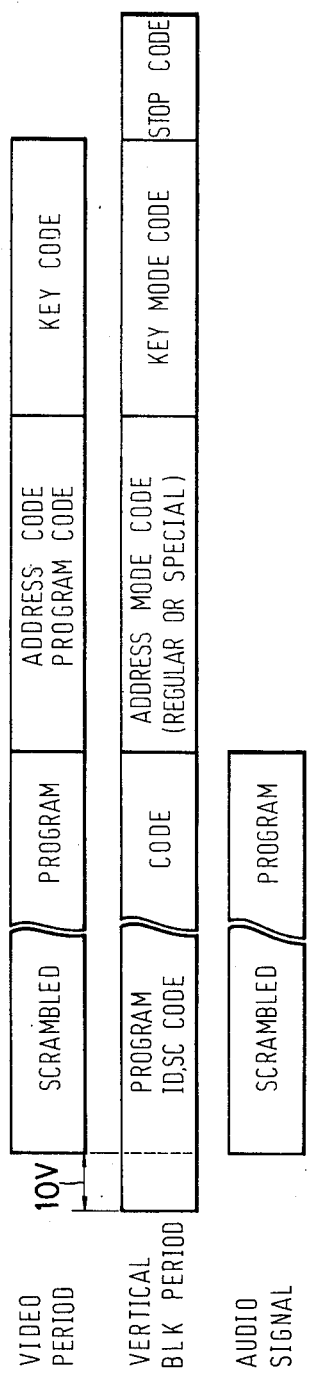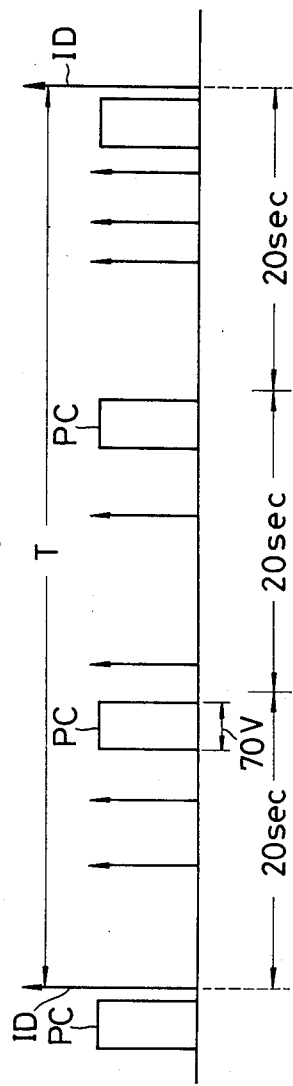

| FIG. 8A |
| FIG. 8B |

4,700,388

APPARATUS FOR SCRAMBLING A TELEVISION SIGNAL

This is a continuation of application Ser. No. 06/518,810, filed July 29, 1983.

BACKGROUND OF THE INVENTION

1. Field of the Invention:

This invention relates to apparatus for scrambling information signal, such as television signal, and more particularly, to apparatus for scrambling the television signal in accordance with specified code signal and changes in the scene of the picture of the television signal.

2. Description of the Prior Art:

A scrambling broadcasting system is conventionally known in which a television signal of a specific program is scrambled and transmitted from a broadcasting station and a subscriber who contracts with the broadcasting station and has a decoder can view the specific program. In such a system, a broadcasting station transmits a scrambled information signal and a key signal for decoding it. A scrambled information signal is obtained by inverting a polarity of a television signal or reversing the signal order at a predetermined period. A non-subscriber is not therefore able to view a correct image or hear sound even if he can receive the scrambled information signal. Accordingly, only subscribers who have contracts with the broadcasting station can unscramble the scrambled information signal in accordance with the key signal and can view and hear the correct image and sound.

In a conventional scrambling broadcasting system as described above, when a scrambled information signal is received by a non-subscriber, the received picture must be non-sensible. For this purpose, various scrambling methods have been proposed.

One scrambling method is known in which a television signal is inverted at a predetermined field period. According to this method, when a scrambled signal is subject to distortion influence by a transmission system, unscrambling at a receiving side may not result in reproduction of an original waveform. For example, when a polarity-inverted signal is reinverted by a decoder, a level difference may be generated or the waveform may be distorted. When an unscrambled signal is supplied to a TV receiver, flicker occurs at the polarity-inverted portion of the picture. Such flicker is particularly noticeable in the case of a still image. When a scrambled program broadcast from a station is recorded by a VTR, flicker tends to be caused more frequently since a VTR is nonlinear in a DC manner as well as in an AC manner.

In order to overcome the above-described disadvantage, U.S. Pat. No. 4,340,906 discloses improved scrambling system, in which the polarity of the television signal is inverted or reversed when the scene change of the picture in the television signal. According to the system, the flickers in the picture will not be noticeable to the viewers. However, the system has a defect that a scrambling code is easily unscrambled even by viewers who do not contract with the broadcasting station, because the scramble code is determined only by the content of the picture in the television signal.

SUMMARY OF THE INVENTION

It is one object of this invention to provide an improved scrambling apparatus which overcomes the above defect.

It is another object of this invention to provide new scrambling apparatus in which the polarity of the television signal is inverted or reversed.

In accordance with an aspect of this invention, the television signal is scrambled by inverting the television signal in accordance with control signal. The control signal is formed on basis of an identification signal which is generated when a change in the picture scene of the television signal and a key code signal which is generated in accordance with specific program of the television signal.

BRIEF DESCRIPTION OF THE DRAWINGS

FIGS. 1A and 1B are timing charts showing an embodiment which performs a scrambling by inverting a polarity of a television signal at a scene change of a picture;

FIG. 2 is a block diagram of a circuit for practicing the method of FIGS. 1A and 1B;

FIGS. 3A to 3E are timing charts showing an embodiment of the present invention;

FIG. 4 shows a format of a television signal for a scrambling broadcast;

FIG. 5 shows an arrangement of various codes inserted in the television signal;

DETAILED DESCRIPTION OF THE PREFERRED EMBODIMENTS

Figure 6:
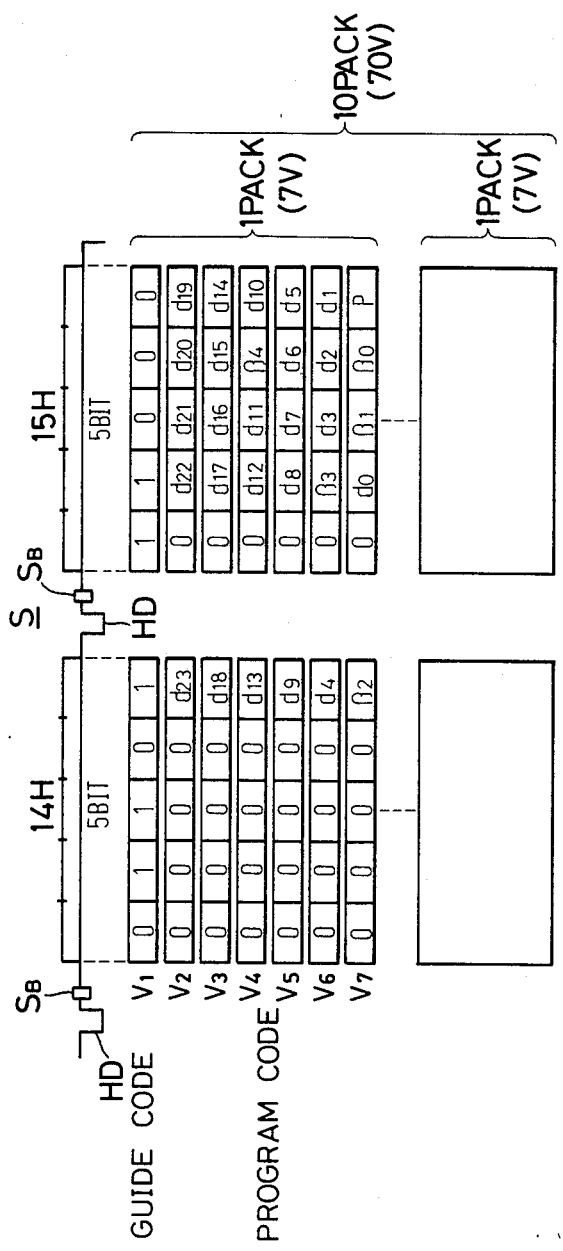
FIG. 6 shows a format of a program code.

FIG. 1 shows an embodiment wherein the polarity of a television signal is inverted at a scene change of a picture. A scene change identification signal SC as shown in FIG. 1A is prepared upon detection of a scene change portion in a television signal of a given program. In accordance with the scene change identification signal SC thus obtained, a scrambling pattern $P_1'$ for instructing polarity inversion as shown in FIG. 1B is generated. When the pattern $P_1'$ is at high level, for example, polarity inversion of the television signal is performed. In practice, the video signal period of the television signal alone is polarity-inverted, and the blanking period is not inverted. When polarity inversion is performed at a scene change, flicker attributable to a level difference or the like as described above occurs simultaneously with a scene change, so that it may be neglected.

FIG. 2 shows an example of a block diagram of a circuit for practicing the method as described above.

A television signal $S_V$ received at an input terminal 101 is supplied to a scrambler 102 as well as to a scene change detector 103 which detects a scene change. Detection of a scene change is performed by differentiating a waveform obtained by integration of the signal $S_V$. In accordance with a detection output from the detector 103, an $ID_1$ generator 104 supplies a scene change identification signal SC to the scrambler 102. Upon reception of each signal SC the scrambler 102 inverts the polarity of the input television signal $S_V$, except for a blanking period, in accordance with the scrambling pattern $P_1'$ as shown in FIG. 1B. The scrambled signal from the scrambler 102 is supplied to an adder 105, and the signal SC is inserted therein. A scrambled signal $S_{VS}$ from the adder 105 appears at an output terminal 106. Note that the adder 105 inserts the scene change identification signal SC in a vertical blanking period BLK of the scrambled signal. At the receiving side, the inserted signal is extracted by a decoder and is used for unscrambling. In order to identify the polarity of the signal during unscrambling, the signal SC may include polarity information by means of a level difference, a pulse width difference or the like.

According to the embodiment as described above, since polarity inversion of the television signal is performed only upon detection of a scene change, unscrambling by a non-subscriber is too easy and only a less effective secret transmission system can be provided.

The present invention has been provided to solve the above problems with the scrambling method using polarity inversion. The present invention will now be described with reference to the accompanying drawings.

Referring to FIG. 3A, a predetermined period T (e.g., 60 seconds) of a television signal of a specific program to be scrambled is preset by an index signal ID. A scene change of such a program is detected so as to obtain a scene change identification signal SC. Then, a key signal pattern $P_1$ which concludes within the predetermined period T as shown in FIG. 3B is prepared. The leading and trailing edges of the pattern $P_1$ coincide with the field period. In accordance with the signals ID and SC and the pattern $P_1$ as described above, one of scrambling patterns $P_2$, $P_3$ and $P_4$ (FIGS. 3C, 3D and 3E) is generated which determines the timing of the polarity inversion. Scrambling is performed by inverting the polarity of a video signal period of a television signal of a specific program in accordance with the pattern $P_2$, $P_3$ or $P_4$. The key signal pattern $P_1$ is repeated at period T.

The pattern $P_2$ is obtained by ANDing the signals ID and SC and the pattern $P_1$ and inverting the polarity of the AND product. The pattern $P_3$ rises with the signals ID and SC and falls at the trailing edge of the pattern $P_1$. The pattern $P_4$ rises with the AND product of the signals ID and SC and the pattern $P_1$ and falls at the signal SC.

Various other scrambling patterns for determining the timing of the polarity inversion may also be formed in accordance with the signal ID and SC and the pattern $P_1$, in addition to those described above.

According to this embodiment, since polarity inversion is always performed at the time of a scene change, flicker may be neglected. Furthermore, since polarity inversion is performed by combining a scene change and a key signal pattern $P_1$, high scrambling effects may be obtained. The present invention also makes unscrambling difficult, and is therefore secure.

The signals ID and SC and the pattern $P_1$ are coded to have a predetermined number of bits and are inserted at predetermined positions of the television signal for broadcasting, as will be described later. At this time, note that the pattern $P_1$ is inserted as a key code signal. The decoder at the receiving side detects the signals ID and SC and the pattern $P_1$ and decodes the scrambling pattern. The decoder unscrambles the signal; it restores the polarity of the polarity-inverted signal in accordance with the scrambling pattern.

Various signals to be transmitted from a broadcasting station together with the scrambled specific program and a method for transmitting such signals will now be described.

FIG. 4 shows the format of a television signal for scrambling a broadcast from a broadcasting station.

In a video signal period, a scrambled specific program, an address code, a program code and a key code are transmitted in the order named. In the vertical blanking period, the program code, codes of ID and SC, an address mode code, a key mode code, a stop code and the like are transmitted in the order named. In the sound channel, a scrambled program is transmitted. The sound signal may be scrambled by various methods in accordance with the scrambling patterns as described above. Each code is transmitted after NRZ modulation of a binary signal of a predetermined number of bits.

The address code is obtained by coding a number assigned to each subscriber and has a regular mode and a special mode. In the regular mode, the station transmits a number code of a subscriber (e.g., a subscriber who has not payed the prescribed charge) who may not receive an ordinary scrambled program. When the decoder of such a subscriber receives a number code corresponding to itself, it is rendered inoperative and cannot perform unscrambling. In the special mode, only a number code of each subscriber who has contracted to receive a special program is transmitted. The decoder of a subscriber which receives the number code corresponding to itself can unscramble the program.

The key code is a decoding key code for unscrambling a scrambled signal and has a code for designating, for example, the pattern $P_1$ shown in FIG. 1B. According to this embodiment of the present invention, the key code is added at the end of the program. Thus, the scrambled broadcast may not be unscrambled unless it is once recorded by a VTR or the like. Thus, a scrambled broadcast is recorded on a tape by a VTR and a key code is recorded at the end of the program. The key code is stored in a memory or the like and the reproduced signal is unscrambled in accordance with the key code. When the key code is added at the end of the program, the program may not be watched in real time. Alternatively, the key code may be added at the start of the program or may be added both at the start and end of the program. Still alternatively, the key code may be added at the start of the program, and may be fetched in the memory after a predetermined period of time from detection of the key code (e.g., after most of the program has been broadcast).

The program code will now be described.

A program code is a code which designates the key code. In order to prevent decoding of a program by non-subscribers, the key code is changed for each year, month, week, day, program or the like. Accordingly, when a pluality of programs are recorded on a tape or when a plurality of tapes are to be reproduced, various key codes are stored in a memory. A program code has contents of a corresponding program. The memory stores each pair of a program code and a key code corresponding to each other. Accordingly, a key code corresponding to a program may be selected by a program code reproduced during reproduction of the program. In the embodiment of the present invention, the program code is expressed by the date of the broadcast and the program number.

The program code is inserted in the vertical blanking period as shown in FIG. 5 together with the codes of the signals ID and SC described above. The program code and the codes of ID and SC are inserted in the 14th and 15th horizontal scanning periods (to be referred to as 14H and 15H hereinafter) of the vertical blanking period.

Referring to FIG. 5, program codes PC are inserted for a 70 V (V: field period) at intervals of about 20 seconds. In other words, a program code PC is inserted in each 14H and 15H; this is repeated every 20 seconds. Codes of ID and SC are inserted in 14H and 15H; this is repeated until the end of the program. When the code of PC and the codes of ID and SC coincide, one of them may be given a priority over the other, which is then deviated from the original position. In this case, it is preferable that the code of PC is deviated. As may be seen from FIG. 4, a program code is transmitted 10 V before the program. During this 10 V period, the receiving side detects reception of a scrambled broadcast and the decoder is rendered operative.

When program codes are added during the entire period of the program broadcast as described above, the program code may be immediately detected and the corresponding key code may be designated irrespective of the reproduction start position of the program. Accordingly, unscrambling may be started immediately even if a pause, FF or RW operation is performed during reproduction.

The address mode code is transmitted during the transmission period of the address code; it represents that the address code is currently being transmitted, and also represents one of the regular and special modes. The address mode code is also inserted in 14H and 15H.

The key mode code represents that the key code is being transmitted; it is inserted in 14H and 15H.

The stop code represents that the scrambling broadcast has been terminated; it is inserted in 14H and 15H.

The data formats of the respective codes as described above will now be described.

Figure 7:
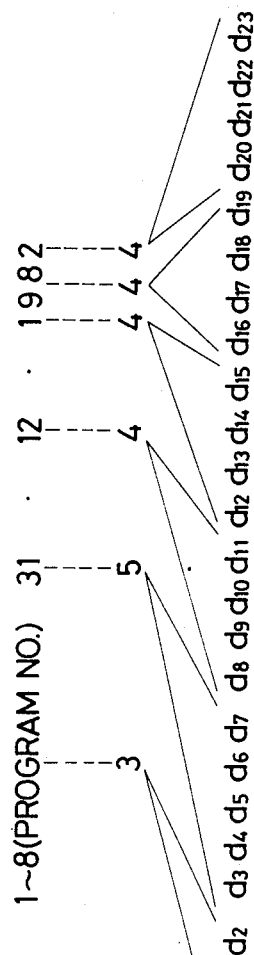
FIG. 7 is a figure for explaining a content of the program code.

FIG. 6 shows the format of a program code. The program code consists of 24 bits of $d_0$ to $d_{23}$ and represents the broadcasting date and the program number. Each bit of a program code is assigned as shown in FIG. 7 in accordance with the corresponding content. Referring to FIG. 6, each of the 14H and 15H periods of a video signal S is divided into five subdivided periods, and one bit is assigned to each subdivided period. Note that reference symbol HD represents a horizontal sync period and $S_B$ represents a color burst signal. A guide code representing a program code is added in 14H and 15H of the first field $V_1$. In the subsequent six fields $V_2$ to $V_7$, bits $d_0$ to $d_{23}$ are added as shown in the figure together with error correction codes $\beta_0$ to $\beta_4$ and "0" bits. The fields $V_1$ to $V_7$ are defined as one pack, and are repeated for 70 V period (10 packs) at intervals of about 20 seconds, as shown in FIG. 5.

Figures 8, 8A:
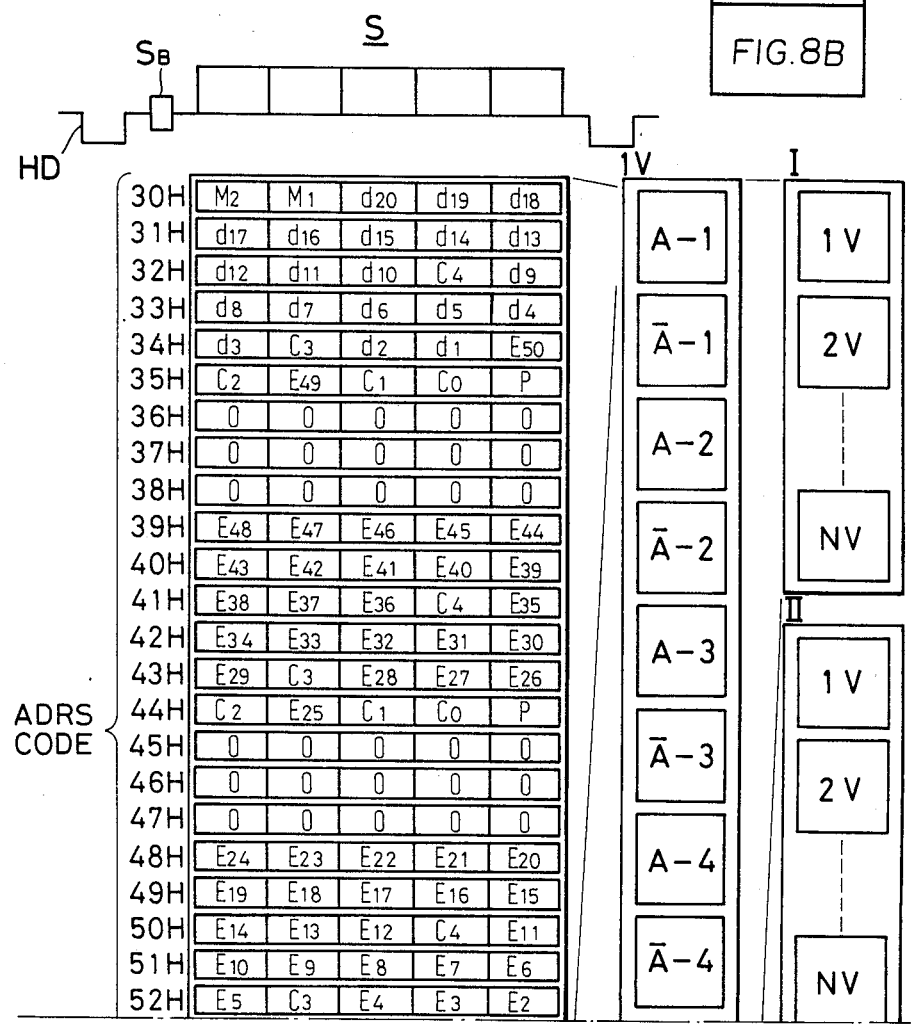
FIGS. 8A and B show a format of an address code and the program code.
Figure 8B:
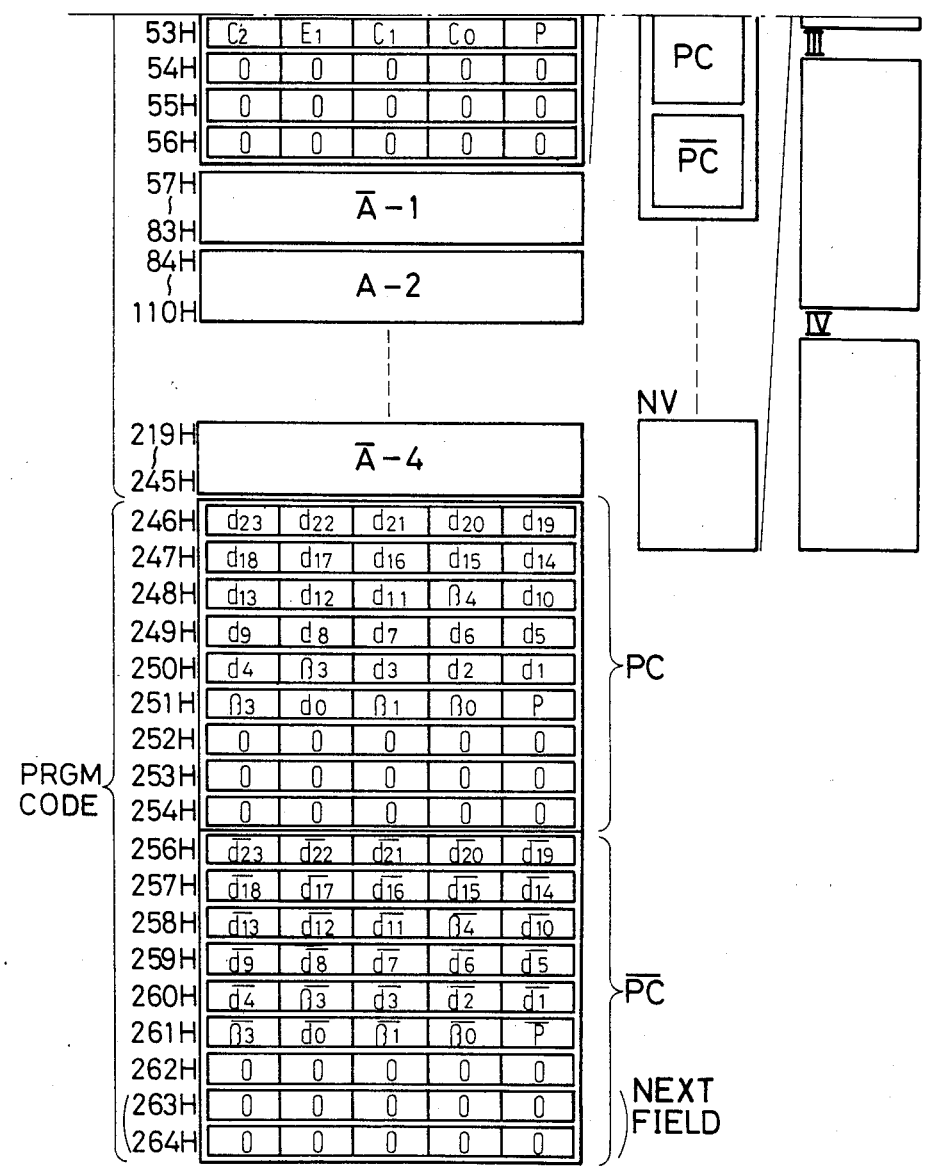

FIG. 8 shows the format of the address code.

In the scrambling broadcasting system according to this embodiment of the present invention, the number of subscribers is designed to be, for example, several hundred thousands to one million and several hundred thousands. Accordingly, it is impossible to represent all the subscriber numbers with a limited number of bits. According to this embodiment of the present invention, all subscribers are divided into a plurality of groups and each group is assigned a corresponding number. Accordingly, each subscriber has a subscriber number which consists of a group number and his number within the group. In this embodiment, the group number comprises a group code of 20 bits: $d_1$ to $d_{20}$. Fifty subscribers are assigned to each group or group number. The fifty subscribers of each group are represented by a home code of 50 bits; 1 bit is assigned to each subscriber in the group. For example, the fifth subscriber within a group identified by a set of bits $d_1$ to $d_{20}$ may be "$d_1, \ldots, d_{20}$, 00001000, $\ldots$, 00". In other words, the fifth bit of the 50-bit home code is set at "1" and the remaining bits are set at "0". Such an address code is inserted in the video signal period together with the program code after the end of the program.

Referring to FIG. 8, the bits $d_1$ to $d_{20}$ representing the group code are inserted in the 30H to 34H period of the signal S. Reference symbols $M_1$ and $M_2$ inserted in 30H are codes which designate the scrambling broadcasting, for example, a broadcasting channel. $E_1$ to $E_{50}$ of a 50-bit home code are divided into two groups which are separately inserted in the 39H to 43H period and in the 48H to 53H period. Note that bit $E_{50}$ is inserted in 34H, and $E_{49}$ is inserted in 35H. Reference symbols $C_0$ to $C_4$ and P denote error correction bits obtained by the Hamming coding method. The "0" bit in each of the 36H to 38H period, the 45H to 47H period, and the 54H to 57H period is a blank time period which is incorporated in view of the operation time of the microcomputer.

In this manner, the 30H to 56H period represents 50 subscribers of a given group which is designated as group A-1. The codes of the group A-1 are inverted to provide an inverted group $\overline{A}$-1 which is inserted in the 57H to 83H period. The group $\overline{A}$-1 is used for error correction. The next 50 subscribers are grouped to provide a group A-2 which is inserted in the 84H to 110H period, and an inverted group $\overline{A}$-2 group is inserted. Similarly, groups A-3, $\overline{A}$-3, A-4 and $\overline{A}$-4 are similarly inserted to represent a further 200 subscribers. Subsequently, together with the bits $\beta_0$ to $\beta_4$, the program code PC as described above is inserted in the 246H to 251H period, and "0" bits are inserted in the 252H to 254H. An inverted code $\overline{PC}$ of the code PC is inserted in the 256H to 261H period, and "0" bits are inserted in the 262H to 264H period. The obtained data is defined as one pack which is about one field. The above operation is therefore repeated for each of the even and odd fields. Thus, each pack of different 200 subscribers is repeated, and all the subscribers may be represented by a total of N fields. The first to Nth fields are then repeated with the identical contents for four times I to IV to complete transmission of the address code. The same contents are transmitted four times so as to prevent detection errors or the like by the decoder.

Figure 9:
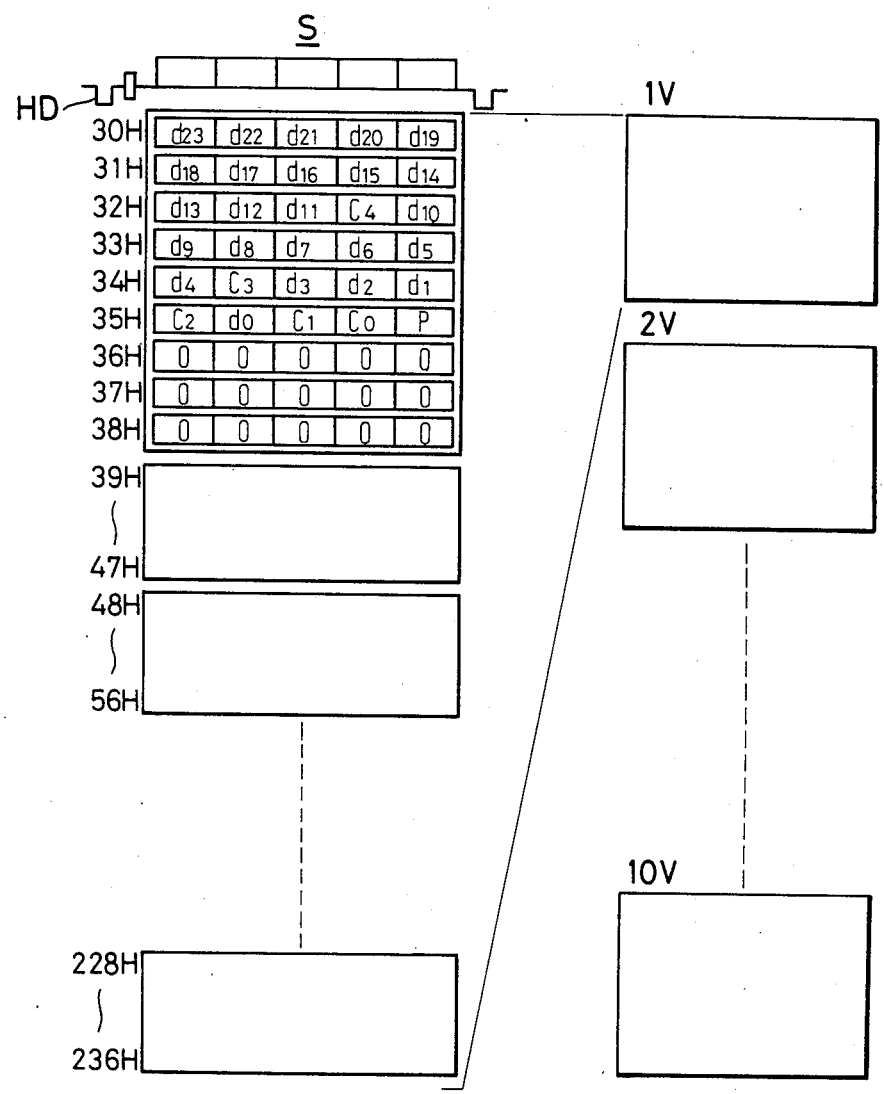
FIG. 9 shows a format of a key code.

The key code will now be described with reference to FIG. 9.

A key code is transmitted in the video signal period after transmission of the address code. A key code consists of a code of bits $d_1$ to $d_{23}$ each five bits of which are inserted in the 30H to 38H period, error correction codes $C_0$ to $C_4$, and P. A combination of such a key code with a 3H period of a no signal period (all "0" period) is defined as one pack. Data of one pack corresponding to a 9H period is repeated for a 10 V period.

Figure 10:
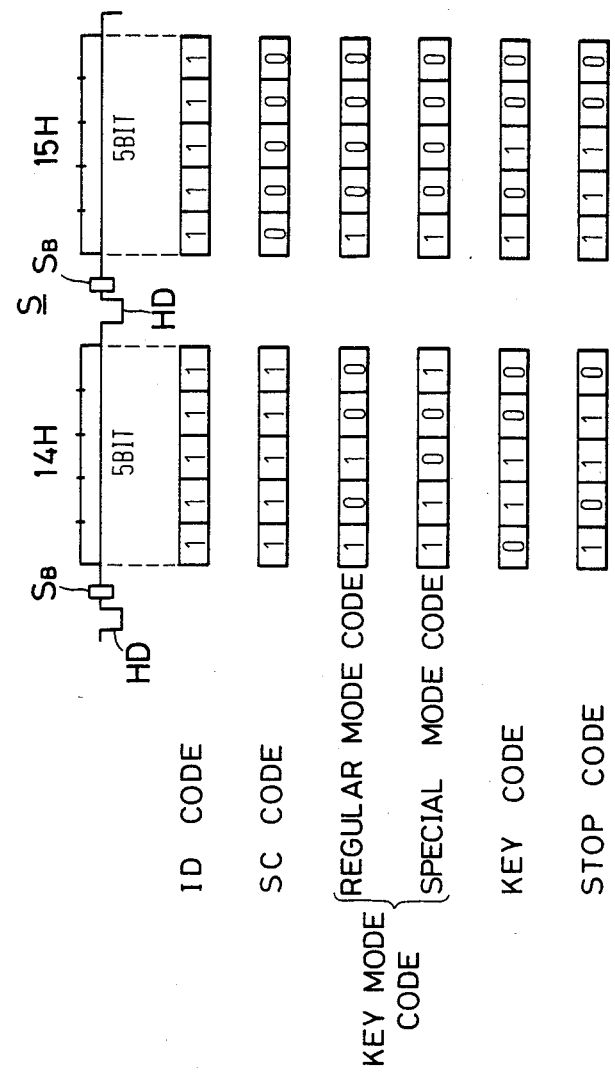
FIG. 10 shows formats of other codes.

The codes of ID and SC, the address mode code, the key mode code, and the stop code will now be described with reference to FIG. 10.

Each of these codes is inserted in the 14H to 15H period of the vertical blanking period. Five bits are assigned to each of the 14H and 15H periods, and these codes are inserted in these five bits in a predetermined code pattern.

A transmitter, a decoder at the receiving side of a scrambled broadcasting signal having codes of the formats as described above, and a scrambled program will now be described.

Figure 11:
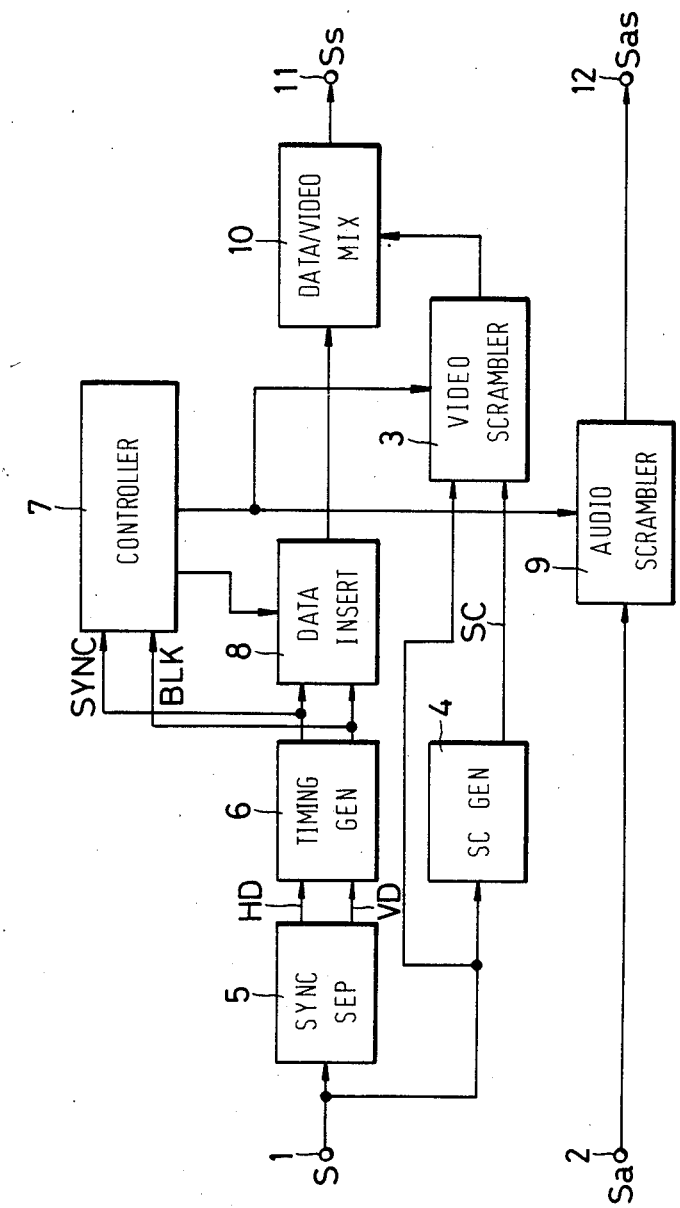
FIG. 11 is a block diagram showing an embodiment of an apparatus for performing scrambling.

FIG. 11 shows an embodiment of a scrambler for performing scrambling at the transmitting side.

A video signal S of a specific program to be scrambled is applied to an input terminal 1, and a sound signal $S_a$ of the program is applied to an input terminal 2. The signal S is supplied to a video scrambler 3 as well as to a scene change detector 4 which detects a scene change and produces a scene change identification signal SC as shown in FIG. 3.

A sync separator 5 separates horizontal and vertical sync signals HD and VD from the signal S. In accordance with the separated signals HD and VD, a timing generator 6 generates a sync signal and a blanking signal BLK so as to drive a controller 7 and a data insertion circuit 8. In accordance with a command from the controller 7, the data insertion circuit 8 produces data of the respective codes shown in FIG. 4 at predetermined timings. The controller 7 forms a key code pattern $P_1$ shown in FIG. 3 and supplies it to the video scrambler 3 as well as to a sound scrambler 9. On the basis of the signal SC and the pattern $P_1$, the video scrambler 3 prepares a scrambling pattern $P_2$, $P_3$ or $P_4$ shown in FIG. 1 and scrambles the signal S according to this pattern.

A data/video mixer 10 mixes the scrambled program with the respective codes and supplies a scrambled video signal $S_S$ to an output terminal 11. The sound scrambler 9 scrambles the signal $S_a$ and produces a scrambled sound signal $S_{as}$ at an output terminal 12.

Figure 12:
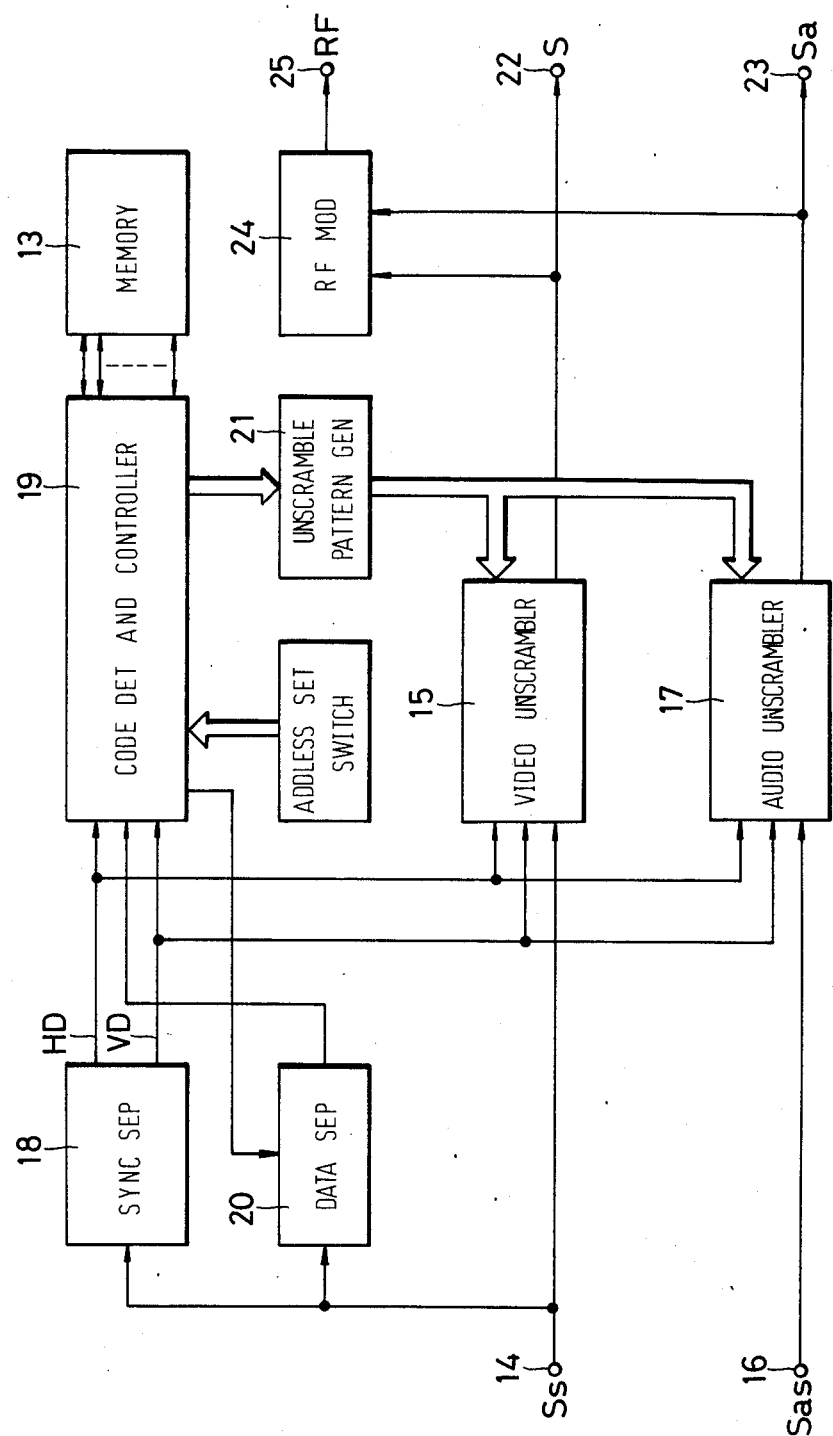
FIG. 12 is a block diagram showing an embodiment of an apparatus for performing unscrambling.

FIG. 12 shows an embodiment of a decoder at the receiving side. The decoder is connected between a VTR and a TV monitor.

When a scrambler broadcast program is recorder on a tape by a VTR, the program code and the key code are stored in a nonvolatile memory 13 in correspondence with each other. The mode of operation of the memory 13 will now be described.

When reproduction from the tape is performed, the reproduced signal $S_s$ is supplied to a video disc unscrambler 15 through an input terminal 14, while the reproduced signal $S_{as}$ is supplied to a sound unscrambler 17 through an input terminal 16. A sync separator 18 separates signals HD and VD from the signal $S_s$ and drives a controller 19 serving also as a code detector and unscramblers 15 and 17. A data separator 20 separates the data of the respective codes from the signal $S_s$ and supplies it to the controller 19.

The controller 19 detects codes of ID and SC as well as the program code so as to read out the corresponding key code from the memory 13. The controller 19 then supplies the respective codes to an unscrambling pattern generator 21. In accordance with the respective codes, the generator 21 recovers the original scrambling pattern and supplies a resultant unscrambling pattern to the unscramblers 15 and 17. The unscrambler 15 inverts the polarity of the signal $S_s$ in accordance with the unscrambling pattern so as to obtain the original signal S, which is then supplied to an output terminal 22. The unscrambler 17 restores the signal $S_{as}$ to the original signal $S_a$, which is then supplied at an output terminal 23. The output signals S and $S_a$ are supplied to line-in terminals of the TV set. It is also possible to convert the frequencies of the signals S and $S_a$ to the empty channel frequency of the TV set by an RF modulator 24, and to supply such converted signals to an antenna terminal of the TV set through an output terminal 25.

Figure 13:
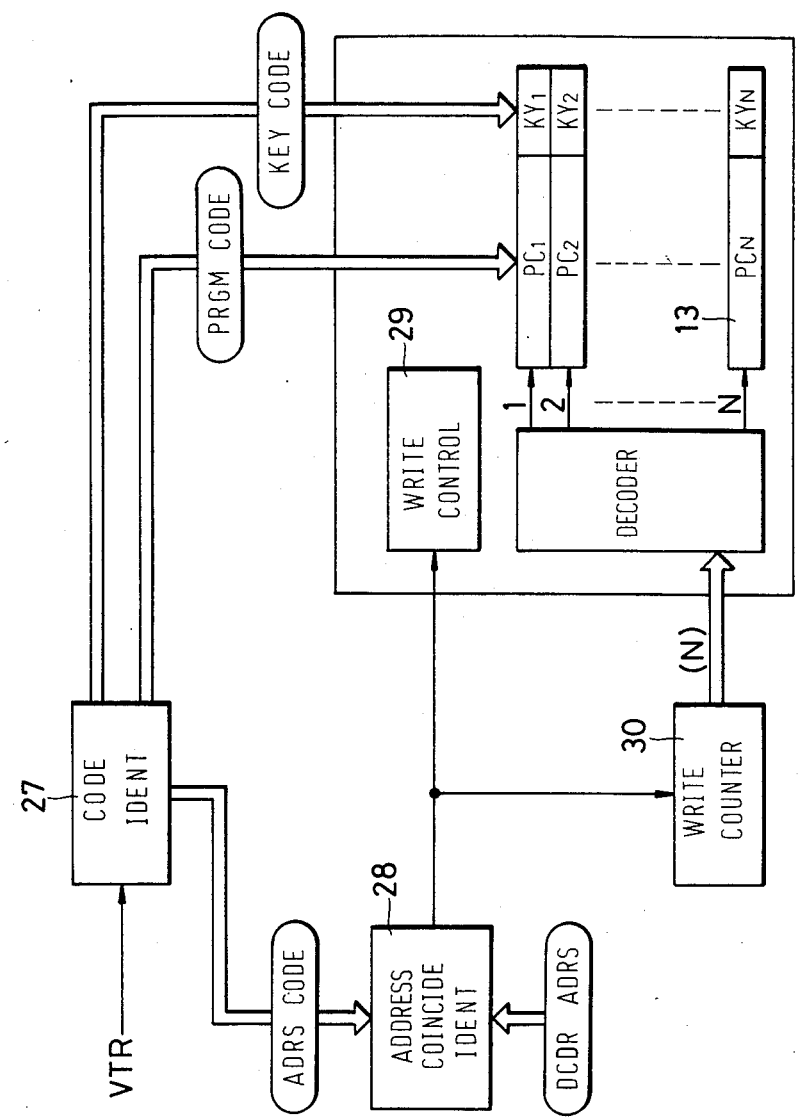
FIG. 13 is a figure for explaining a mode of operation of a memory of the apparatus for performing unscrambling in recording mode for an unscrambled broadcast by a VTR.
Figure 14:
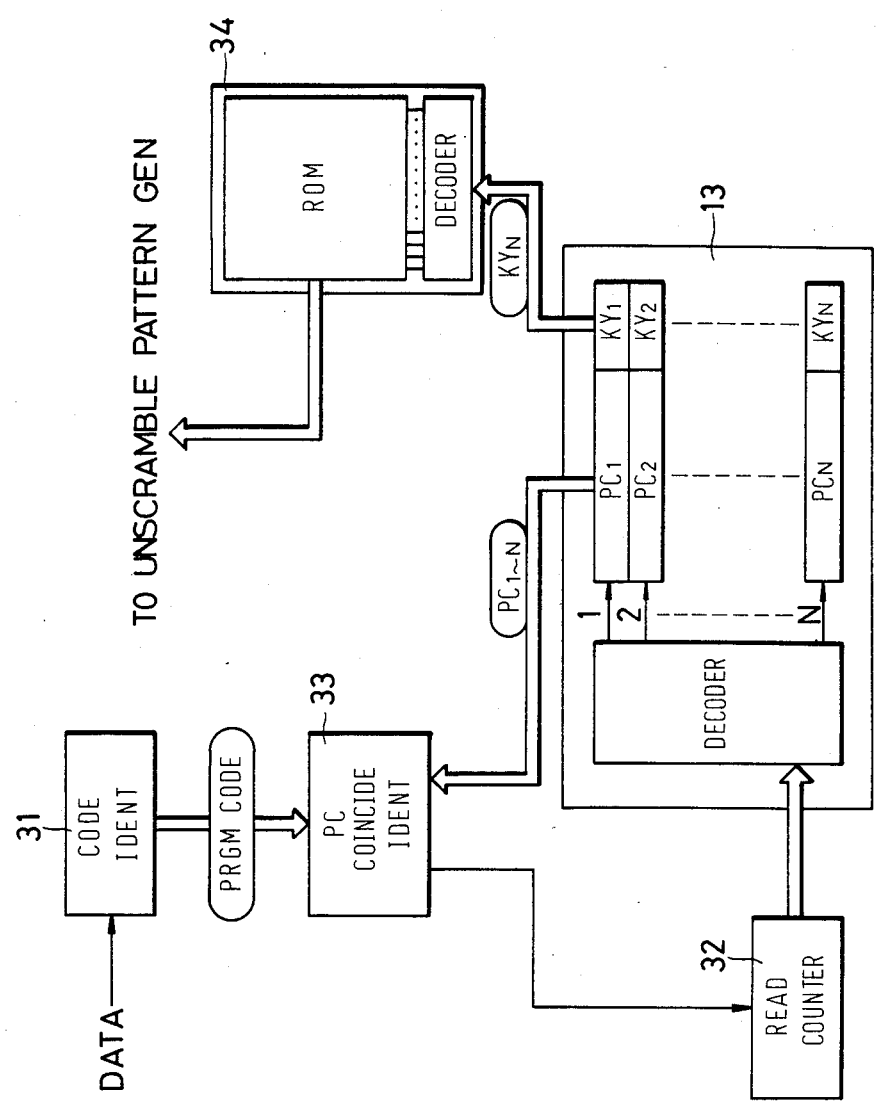
FIG. 14 is a figure for explaining a mode of operation of the memory in reproduction mode by the VTR.

FIG. 13 is for explaining the mode of operation of the memory 13 in the recording mode, while FIG. 14 shows the same in the reproduction mode.

In the recording mode, a code discriminator 27 shown in FIG. 13 detects an address code and an address mode code from a signal supplied from a VTR. In this mode, the VTR is set in the E-E mode, and a monitoring signal is supplied to a decoder. In the regular mode, when a decoder address (subscriber number) corresponding to the decoder is included in the received address code, an address coincidence discriminator 28 detects such an address coincidence and stops a write control circuit 29 and a write counter 30. Thus, the memory 13 does not store a key code. When the corresponding decoder address is not included in the address code, the discriminator 27 stores the program code and the key code in the memory 13. Accordingly, when a plurality of programs are recorded, program codes $PC_1$ to $PC_N$ and key codes $KY_1$ to $KY_N$ are stored in the memory 13 in correspondence with each other. In the special mode, the codes are stored in the memory 13 only when the decoder address is included in the address code.

In the reproduction mode, a code discriminator 31 shown in FIG. 14 detects the program code from the reproduced data and supplies it to a PC coincidence discriminator 33. A read counter 32 sequentially reads out the program codes $PC_1$ to $PC_N$ form the memory 13 and supplies them to the coincidence discriminator 33. When the reproduced program code coincides the read-out program code, the corresponding key code is read out. A ROM 34 stores, for example, 30 types of unscrambling patterns. Data corresponding to the readout key code is read out from the ROM 34. The readout data from the ROM 34 is supplied to the unscramling pattern generator 21 shown in FIG. 10.

What is claimed is:

1. In an apparatus for scrambling a television signal by inversion thereof in response to a control signal, the combination comprising:

means for detecting a change in the scene represented by the television signal during field intervals of a specific program thereof and generating a scene change identification signal distinct from said television signal in response to each detection;

means for generating a key code signal having a selected one of a plurality of patterns independent of any content of said television signal and associated with said specific program of the television signal, said plurality of patterns varying unpredictably from one another;

means for combining said scene change identification signals and said key code signal to produce said control signal having a control pattern indicative of said scene change identification signals and said key code signal only in combination, said television signal being inverted in accordance with said control pattern to produce a scrambled television signal which may be descrambled so as to be reproducible without flicker; and means for adding said scene change identification signals into those vertical blanking periods of said scrambled television signal corresponding to the field intervals for which a change was detected and for appending at least a part of said key code signal having a short duration relative to that of said specific program at the end of said television signal corresponding to said specific program, whereby said scrambled television signal may be descrambled in accordance with said control pattern determined solely from said transmitted scene change identification signals and key code signal only after said specific program has been completely transmitted.

2. An apparatus according to claim 1, in which said key code signal generating means controls said pattern of said key code signal to repeat at a predetermined interval and includes means for producing a key code identification signal at every said predetermined interval, said means for adding inserting said key code identification signal into said vertical blanking periods of said television.

3. An apparatus according to claim 2, in which said scene change and key code identification signals have specific code patterns, respectively, which are inserted into a predetermined horizontal period of said vertical blanking period.

4. An apparatus according to claim 3, in which said combining means comprises an AND circuit receiving said scene change identification signal and said key code signal, whereby said scene change identification signal gated by said key code signal is said control signal.

5. An apparatus according to claim 4, in which said combining means comprises means for forming said control signal in response to said scene change and key code identification signals and the starting and trailing edges of said key code signal.

6. An apparatus according to claim 5, in which said control signal comprises a rectangular signal which is set by one of said scene change identification signal and said key code identification signal in combination therewith, and which is reset by said trailing edge of the key code signal.

7. An apparatus according to claim 5, in which said control signal comprises a rectangular signal which is set by one of said scene change identification signal and said key code identification signal gated by said key code signal, and which is reset by said scene change identification signal.

8. An apparatus according to claim 2, wherein said means for adding includes mixing means for inserting said key code identification signal into said vertical blanking periods in response to said control signal from said combining means.

9. An apparatus according to claim 1, in which said television signal has a video signal component; and wherein said means for combining includes video scrambler means for scrambling said video signal component in response to said control signal.

10. An apparatus according to claim 1, in which said television signal has an audio signal component; and further comprising audio scrambler means for scrambling said audio signal component in response to said key code signal.

11. An apparatus for descrambling a television signal of a specific program thereof scrambled in accordance with a transmitted key code signal having a selected one of a plurality of patterns, said plurality of patterns varying unpredictably from one another, said key code signal being selected for said specific program and being independent of the content thereof, said television signal being scrambled in accordance with said key code signal only in combination with scene change identification signals indicative of a change in the scene represented by the television signal during field intervals of said specific program, said scene change identification signals being added to said scrambling television signal and transmitted therewith during those vertical blanking periods thereof corresponding to the field intervals for which a change was detected, a program code identifying said specific program also being added to said scrambled television signal during vertical blanking periods thereof and transmitted therewith, at least a part of said key code signal being transmitted at the end of the specific program said apparatus comprising:

memory means for storing the transmitted key code signal and said scrambled television signal including said scene change identification signals and program code added thereto;

means for retrieving said scrambled television signal from said memory means;

code detector means for detecting said program code and said scene change identification signals added to and transmitted with the scrambled television signal in the retrieved scrambled television signal;

means for retrieving said key code signal from said memory means in response to the detecting of said program code; and means employing said key code signal retrieved from said memory means solely in combination with the detected scene change identification signals for descrambling said scrambled television signal retrieved from said memory means so as to reproduce the same without flicker.

12. The apparatus of claim 11; wherein said means employing said key code signal includes descramble pattern generator means for generating a descramble pattern signal in response to said key code signal means, video descrambler means for descrambling the video portion of said scrambled television signal in response to said descrambling the audio portion of said scrambled television signal in response to said descramble pattern signal.

13. The apparatus of claim 12; and further comprising sync signal separating means for separating horizontal and vertical sync signals included in said scrambled television signal and supplying said sync signals to said code detector means and said audio and video descrambler means.

14. The apparatus of claim 12; and further comprising RF modulating means for receiving the descrambled audio and video portions of said scrambled television signal from said audio and video descrambler means and converting said signals to predetermined television channel frequency signals.

15. The apparatus of claim 11; and further comprising code separating means for separating said program code and key code signals from said scrambled television signal and supplying the separated program and key code signals to said code detector means.

16. An apparatus according to claim 1, in which said means for generating a key code signal includes means for generating an index signal at a predetermined frequency, said key code signal being generated with a predetermined subpattern repeating at said frequency of said index signal, said means for adding inserting said index signal into said vertical blanking periods of said scrambled television signal.

* * * * *